Sept. 30, 1969 F. G. KRAL 3,469,847

TRANSPORT DEVICE FOR PERMITTING CONTINUOUS OR SINGLE PLAY OF A MAGNETIC RECORD CARD

Filed Aug. 13, 1965

Inventor:
Fred G. Kral.

United States Patent Office 3,469,847

Patented Sept. 30, 1969

3,469,847

TRANSPORT DEVICE FOR PERMITTING CONTINUOUS OR SINGLE PLAY OF A MAGNETIC RECORD CARD

Fred G. Kral, Berwyn, Ill., assignor to Bell & Howell Company, Chicago, Ill., a corporation of Illinois Filed Aug. 13, 1965, Ser. No. 479,562
Int. Cl. G11b 5/02
U.S. Cl. 274—4 1 Claim

ABSTRACT OF THE DISCLOSURE

A mechanism for transporting magnetically striped record cards in a guide track past a magnetic transducer selectively for a single pass or plural passes. A pivotable switch gate in the guide track is movable selectively between a straight line single pass condition and a card turn-out condition to guide the card into arcuate track portions wherein the card again passes the transducer and the switch gate.

The present invention relates to a record translocation mechanism for a sound reproduction device or record player. Particularly, the invention relates to a translocation mechanism in a sound reproducing device or record player for carrying in vertical disposition a magnetic record card to permit repeated or single play.

Magnetic record cards and sound reproduction devices or players therefor of the general class with which the instant invention concerns itself are disclosed in United States Letters Patent 2,603,006 issued July 15, 1952 to C. M. MacChesney et al., according to which it is shown as previously known to provide a lineal record track along which a vertical magnetic record card is advanced from a track entrance to a track exit past a single station at which there is disposed magnetic pick-up head means. Such known construction permits only a single pass of the magnetic pick-up head station by a record card for each time it is placed in the record track, manipulation or handling being required for each pass of the pick-up head required or desired. That is to say, assume that it is desired to repeatedly reproduce sound from indicia imposed upon the magnetic media carried on a record card by using a heretofore known player. To do so would require repeated handlings inasmuch as the carrier track of such prior record player is lineally disposed.

The utility of record players for playing magnetic record cards could be enhanced if automatic means were provided for continuous or repeated playing of a record card, because then handling, required when employing heretofore known mechanisms, could be obviated. For example, a record card employed as a dictionary of pronounciation could be repeatedly player without the interruption or time-lag attendant the use of previously known devices occasioned by the requirement to handle the card to be repeatedly played at the entrance and exit ends of a record track. Moreover, use of devices of the instant class could be expanded for the repeated playing of short announcements or messages such as at airports for announcing flights and in supermarkets for the announcing of specials during the course of a day.

In accordance with the present invention and as a prncipal object thereof, there is provided, in a sound reproducing device of the class adapted for playing a magnetic record card, means for permitting automatic repeated playing of a record card without manipulation or handling for each play.

It is another object of the present invention to provide in association with such last mentioned means a selector mechanism for limiting the number of plays of the magnetic record card.

It is a further object of the present invention to provide, in a record player of the class adapted for the playing of vertically transported record cards, an orbital track by means of which a record card can be repeatedly carried into operative engagement with pick-up head means for repeated reproduction of recorded indicia carried by such card.

It is an additional object of the present invention to provide in a sound reproducing device of the designated class means for translocation of a vertical record card and characterized by an orbital track coextendable with a lineal track and selectively operable switch means by which record cards can be selectively switched from either track to the other thereof whereby such record card can be played singly and repeatedly for a selected number of plays.

These and other objects of the invention will be readily apparent from the following description taken in conjunction with the drawings in which like numerals refer to like parts.

Figures 1, 2:
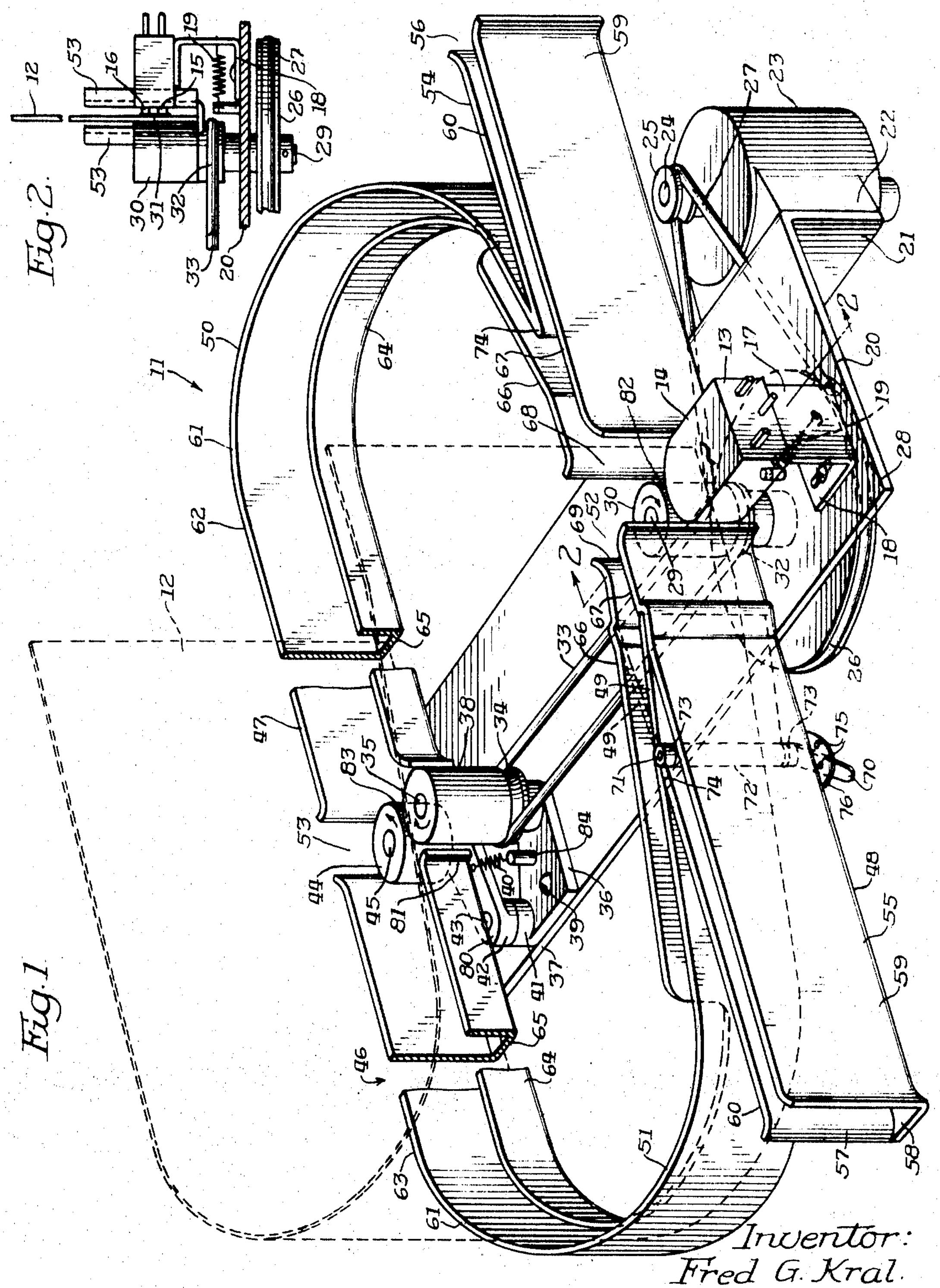
FIG. 1 is a perspective view of one embodiment of the present invention.
FIG. 2 is a vertical sectional view taken substantially on the line 2—2 of FIG. 1 and looking in the direction of the arrows.

Referring now more particularly to the drawings, there is shown in FIG. 1 a transport mechanism generally designated 11 for translocation of a record card 12, which is shown in dotted lines in FIG. 1, in vertical position past the magnetic pick-up head support 13 of a sound reproduction unit or record player. The details of construction of the sound reproduction unit or record player may be conventional and are not limiting on the invention, and therefore, other than to the extent indicated, it is considered unnecessary to show such details, the invention pertaining to the means for translocating the record card 12. As fashioned, the magnetic pick-up head support comprises a horizontal housing or casing 14 in which, as illustrated in FIG. 2, there is mounted magnetic pick-up head means which in the present embodiment comprises a pair of magnetic pick-up heads 15 and 16 which may be of conventional construction and project horizontally outwardly from the housing or casing 14. The housing or casing 14 is supported on the upper end of a vertical stand 17 having a lower horizontal flange 18 which is rigidly secured by means of suitable fasteners such as screws 19 or the like to one end portion 28 of an elongated base 20.

As illustrated in FIG. 1, base 20 may have a depending flange 21 to which the mounting boss 22 of a motor housing 23 is rigidly secured by any suitable means (not shown). A motor drive shaft 24 which extends vertically upwardly from the motor housing 23 has secured thereon a sheave 25 which is constrained for rotation with said motor shaft and which is operably connected to a flywheel 26 by means of a belt 27 which drivingly or frictionally engages in the grooves of the sheave and the flywheel in a customary manner. The flywheel 26 is shown as being horizontally disposed beneath the base 20 and is secured to the vertically disposed spindle 29 of a capstan 30. The capstan 30 is rotatably secured above base 20 on an upward projection of said spindle 29 and is constrained for rotation with said flywheel by suitable means which are not clearly evidenced in the drawings as they may be conventional and are not intended as limitation on the instant invention. The capstan 30 is disposed adjacent the record engaging surfaces of the magnetic heads 15 and 16 though slightly spaced therefrom and is disposed in operable relationship therewith whereby the record card 12 in vertical disposition can be driven horizontally by said capstan along an elongated path in a horizontal plane past said magnetic pick-up heads 15 and 16 in a manner such that a horizontal magnetic track member 31 disposed longitudinally of and carried by said card 12 will be urged into playing engagement with said magnetic pick-up heads 15 and 16, as illustrated in FIG. 2.

The lower end portion of the drum comprising capstan 30 has an annular groove 32, as shown in FIG. 2. A drive belt 33 which frictionally engages in groove 32 transmits the torque of capstan 30 to a capstan 38 by reason of frictional engagement of the belt 33 in a groove 34 formed in the lower end portion of the drum comprising the capstan 38 which is horizontally aligned with said capstan 30. The capstan 38 by suitable means (not shown) is constrained for rotation with its vertical spindle 35 which is journalled in a boss or plate 36, said plate 36 being mounted on the upper surface of the opposite end portion 37 of the base 20 by means of suitable fasteners such as screws 39 or the like. As illustrated in FIG. 1, an upwardly extending bearing member 41 which may be fashioned integrally with the plate or boss 36 defines an upper flat against which one end portion 80 of an arm 42 is journalled about the vertical axis defined by a pin 43 that is suitably mounted in said bearing 41 and arm end portion 80. A roller 44, which is journalled on the opposite end portion 81 of the arm 42 about a vertical axis defined by pin 45 suitably supported in said arm end portion 81, is biased toward the capstan 38 in record card driving relationship by means of an expansion spring 40 one end of which is suitably anchored in a medial portion of the arm 42 and the opposite end of which is anchored to a post or peg 47 which is fixed to and projects upwardly from the plate or boss 36.

As illustrated in FIG. 1, the capstans 30 and 38 may be characterized as being in substantial transverse alignment with the roller 44 and the magnetic pick-up head housing 14, said capstans being disposed inwardly of said roller and said housing and transversely of a conveyor track structure generally designated as 46. As fashioned, the conveyor track construction 46 comprises an orbital track structure 47 communicatively connectable to a straight or side track structure 48 by means of a track switch section 49. The track construction 46 comprises two substantially equal halves, one being a right track portion 50 and the other being a left track portion 51, differing in construction only to the extent herein designated. The spacing between the right and left track portions 50 and 51 generates therebetween a pair of gaps 52 and 53. Gap 52 is of a size adequate to accommodate therein the capstan 30 and the magnetic head housing 14 having therebetween a space 81 which, to the extent generated, is disposed in the course of the track construction 46. Gap 53 is of a size adequate to accommodate therein the roller 45 and the capstan 38 in related aspects which positions the space 83 generated between the roller 45 and capstan 33 in the course of the track construction 46.

As illustrated in FIG. 1, the straight track structure 48 comprises a pair of straight right and left or upstream and downstream spaced apart track sections 54 and 55 which are separated by the gap 52. Distally of the gap 52 the straight track section 54 defines a record card entrance opening 56 and distally of the gap 52 the straight track section 55 defines a record card exit opening 57. The straight track sections 54 and 55 are each defined by a floor 58 from which there extends normally upwardly an outer vertical guide wall 59 and an inner vertical guide wall 60 spaced apart from and parallel to its respective guide wall 59, the guide walls 59 and 60 of each of the track sections 54 and 55 being integral with their respective floors 58. From the respective of opposite end openings 56 and 57, each inner guide wall 60 extends inwardly toward the gap 52, a distance which is less than the length of its respective guide wall 59 to a position at which such inner guide wall 60 joins one end of the outer guide wall 61 of a respective of a pair of orbital track sections 61 and 63 in a V-shaped juncture 74.

As illustrated in FIG. 1, the orbital track structure 47 may be elliptical in configuration with those parts thereof defined by the track portions 50 and 51 being the aforesaid orbital track sections 62 and 63 which, accordingly, would be semi-elliptical in shape with their adjoining ends spaced apart by the gaps 52 and 53. As shown, the outer guide wall 61 of each of the sections 62 and 63 is parallel to an inner guide wall 64, each of said guide walls 61 and 64 being vertical and integral with a floor 65 defining its respective of the track sections 62 and 63. It also is seen that each of the inner guide walls 64 extends longitudinally of its respective of said track sections 62 and 63 a distance greater than its associated outer guide wall 61 extends. Thereby, there is formed in each of the orbital track sections 62 and 63 an inner guide wall extension 66 which is disposed parallel to an outer wall extension 67 of each outer guide wall 59. Between the respective extensions 66 and 67 there is formed the downstream end part 68 of the track portion 50 and the upstream end part 69 of track portion 51 of which each inner guide wall 64 is disposed opposite a corresponding outer guide wall 59 without any intermediate structure. That is to say, the orbital and straight track sections of each of the track portions 50 and 51 merge into a common opening, such opening in track portion 50 defining an entryway to the space 82 and the corresponding opening in track portion 51 defining an upstream entrance downstream of the capstan 30 from which access can be gained either to the orbital track 47 or to the downstream section 55 of the straight track 48.

The heretofore identified track switch section 49 provides the means for governing the course of the record card 12 and controlling the access to the orbital track 47 and the downstream track section 55 of the track 48. Operation of the track switch section 49 is controlled by an arm 70 having a manual extension which may be projected from below the track construction 46. A vertical pivot member 71 which is disposed in a sleeve 72 mounted at the juncture 74 of the left track portion 51 provides an axis of rotation for the track switch section 49 which is a substantially rectangular plate. A pair of lower and upper bosses 73, 73 which may be fashioned with switch section 49 are mounted on pivot member 71. Thereby, through operation of the arm 70 the switch section 49 is rockable about the axis defined by said pivot member 71. The arm 70 is rockable in a horizontal plane and tensioned adjacent a suitably supported horizontal plate or boss 76 for urging a detent or lug carried by the arm 70 into an adjacent of a pair of spaced recesses 75 formed in said plate or boss 76 to lock the lever in alternate positions. By having reference to FIG. 1, it is appreciated that there are two alternate operative positions for the arm 70 corresponding to alternate operable conditions of the track switch section 49. One is that which disposes said switch angularly across the outer and inner guide walls 59 and 60 of the downstream section 55 to block access thereto and to limit access in the track construction 46 to the orbital track 47 downstream of the capstan 30, such being the position shown in solid lines in FIG. 1 in which the track switch section 49 is disposed for endless movement of the card 12 in the orbital track. The other or alternate position of the arm 70 is that which would result if said arm 70 were moved from the position illustrated in the drawings counterclockwise to engage its detent in the right of the recesses 75 in which event the track switch section 49 would be moved to the dotted line position illustrated in FIG. 1 to block access between the guide walls 63 and 64 of the orbital section 61 downstream of the capstan 30, said track switch section 49 then being parallel to the guide wall 59 of the straight track section 55 to guide the record card 12 into said downstream track section 55.

It is observed that the height of the guide wall 61 as well as the guide walls 59 and 60 is substantially greater than the height of the guide walls of previously known devices of the instant class. By increasing the height of the guide walls, more support is provided for the record card 12. However, to avoid the possibility of scratching the magnetic track means which faces outwardly to the end that it will engage the magnetic pick-up heads 15 and 16, the outer guide walls could be suitably relieved at a horizontal level of the magnetic track means 31. While only a single magnetic track means 31 has been identified herein, it may comprise a pair of adjoining magnetic tracks in which to record magnetic characters or indicia, produced for example, by an instructor and a student and playable selectively by the heads 15 and 16 in a manner which will be evident to those skilled in the art. The magnetic track means either can be applied as a tape or can be printed on with magnetic ink, according to preference, neither magnetic medium being intended as limiting on the present invention.

It is observed that the capstan 30 and associated housing 14 and the capstan 38 and associated roller 45 define opposed gripping members for the magnetic record card 12. For most effective orbital travel of the card 12, it is preferable that the distance or the length of the path or course between opposed capstans 30 and 38 be slightly shorter than the length of the record card to the end that the record card will always be positively driven. That is to say, should the spacing between the opposite drive mechanisms longitudinally of the path or course of the orbital track 47 be greater than the length of the record card 12, the record card 12 would become stalled in the track because of lack of effective drive. Obviously, if the record card 12 is a little longer than the distance longitudinally of the path between the two capstans, there will be a period of silence almost equal to the time of playing. If it is desired to have more sound and less silence, it would merely require that longer record cards be employed.

In use, a magnetic record card 12 will be inserted through the entrance 56, such card preferably being of a length sufficient to cause engagement of its lead end upon insertion into the track section 54 between capstan 30 and the magnetic pick-up heads 15 and 16 thereby to drive the card downstream, that is to the left with respect to FIG. 1. Should the track switch section 49 be in the dotted line position illustrated in FIG. 1, card 12 would merely pass through the straight track 48 and pass from the device through the exit 57 after one play of the record card. However, should the track switch section 49 be in the position illustrated by the solid lines in FIG. 1, after insertion through the entrance 56 the card would be switched or shunted into the orbital track 47 in which it would continuously orbit for repeated playings each time it passed the housing 14 until such time as the track switch section 49 were conditioned to the dotted line position shown in FIG. 1, at which time as the card 12 completed its last orbit, it would be blocked from the orbital track 47 and guided into the downstream track section 55 of the straight track 48 following which it would be driven from the device through exit 57. It is appreciated that the capstan 30 is disposed in the gap 52 at the exit or downstream end of the combined track sections 54 and 62 and at the upstream end of the combined track sections 63 and 55.

It will be understood that modifications and variations may be effected without departing from the scope of the novel concepts of the present invention.

The embodiments of the invention in which an exclusive property of privilege is claimed are defined as follows:

1. In a record player for reproducing sound from indicia recorded horizontally of a vertical record card adapted for movement longitudinally of a path, said record player having a track defining a path adapted for advancement longitudinally thereof of a record card, indicia pick-up means mounted in fixed position along said track and adapted to sense indicia carried by a record card, and record driving means mounted in opposed relationship to said pick-up means and adapted to advance a record card longitudinally of said path in sensing engagement with said pick-up means, the improvements in said track characterized by:

a pair of horizontally spaced track parts defining therebetween a pair of gaps in said path, said gaps spaced from each other longitudinally of said path a distance less than the length of said path occupied by a record card therein, each of said track parts defined by an arcuate section having opposite open ends and a straight section having opposite open upstream and downstream ends, one open end of each straight section connected to an open end of an arcuate section, said straight sections being horizontally aligned with each other, said driving means mounted in a first of said gaps;

a record card drive mechanism drivable by said driving means and disposed in the second of said gaps; and track switch means mounted adjacent the upstream end of a first of said straight track sections, the upstream end of the second of said straight sections serving as a card entrance, the open ends of said arcuate track sections arranged in upstream-downstream relationship, the downstream end of the first of said arcuate sections spaced from the upstream end of the second of said arcuate sections and defining the second of said gaps, the downstream ends of said second arcuate sections and said second straight track section connected together and defining a common record card exit from one of said track parts, the upstream ends of said first arcuate track section and said first straight track section connected together and defining a common inlet to said other track part, said switch means rockable in said common inlet, the downstream and upstream ends of said straight sections lineally aligned and defining the first of said gaps, whereby from said common card exit a record card can be directed in said common card inlet to the first of said arcuate sections for repeat play or to the first of said straight sections for exit through the latter from the record player.

References Cited

UNITED STATES PATENTS

| | | | |
|---|---|---|---|
| 3,406,382 | 10/1968 | Wilmer | 179—100.2 |
| 3,114,150 | 12/1963 | Calano et al. | 346—74 |
| 3,329,424 | 7/1967 | Rabek | 271—64 |
| 2,946,593 | 7/1960 | Beyer | 274—4.2 |
| 3,293,543 | 12/1966 | Nelson | 346—74 |

OTHER REFERENCES

Jackowski, C. S. "Card Feed Mechanism," IBM Technical Disclosure Bulletin, vol. 3, No. 10, March 1961, p. 74.

BERNARD KONICK, Primary Examiner

JEROME P. MULLINS, Assistant Examiner

U.S. Cl. X.R.

179—100.2; 271—3